United States Patent [19]

Forge

[11] Patent Number: 4,910,654
[45] Date of Patent: Mar. 20, 1990

[54] CURRENT LIMITING SCHEME FOR THE AC INPUT CIRCUIT TO A SWITCH MODE POWER SUPPLY

[75] Inventor: Charles O. Forge, Los Altos, Calif.
[73] Assignee: Uniphase Corporation, San Jose, Calif.
[21] Appl. No.: 295,965
[22] Filed: Jan. 10, 1989
[51] Int. Cl.⁴ .................. H02H 7/125; H02H 7/06
[52] U.S. Cl. ........................ 363/49; 363/53; 363/126; 323/908
[58] Field of Search ............ 363/49, 52, 53, 125, 363/126; 323/901, 908

[56] References Cited

U.S. PATENT DOCUMENTS 3,723,850  3/1973  Daniels et al. ............... 363/126
4,207,516  6/1980  Babcock ....................... 323/908

OTHER PUBLICATIONS

C. H. Banthorpe, "A Low Voltage Power Supply", Practical Electronics, vol. 11, No. 11, Nov. 1975, pp. 914–916.

Primary Examiner—Peter S. Wong
Attorney, Agent, or Firm—Skjerven, Morrill, MacPherson, Franklin & Friel

[57] ABSTRACT

A DC switch mode power supply operating from an AC input power source typically has an input stage which includes a rectifier for rectifying the AC input power waveform to provide a DC voltage to the switch mode power supply. This rectifier includes a capacitive storage circuit for storing the DC power to be supplied to the switch mode power supply. To protect the circuit against current surges during start-up, normally an open relay is provided in parallel with a current limiting resistor. This resistor can burn out under some circumstances. This invention replaces the resistor with a capacitor divider circuit containing at least one capacitor in series between the storage capacitor and one of the terminals from the input power supply. A second capacitor can also be provided in parallel with the storage capacitor and one of the diodes of the rectifier. Another diode of the rectifier is in series with the storage capacitor. The resulting circuit limits the initial current surge to the storage capacitor and also functions as a charge pump to make possible the storage of a charge on the storage capacitor greater than the peak input voltage.

10 Claims, 9 Drawing Sheets

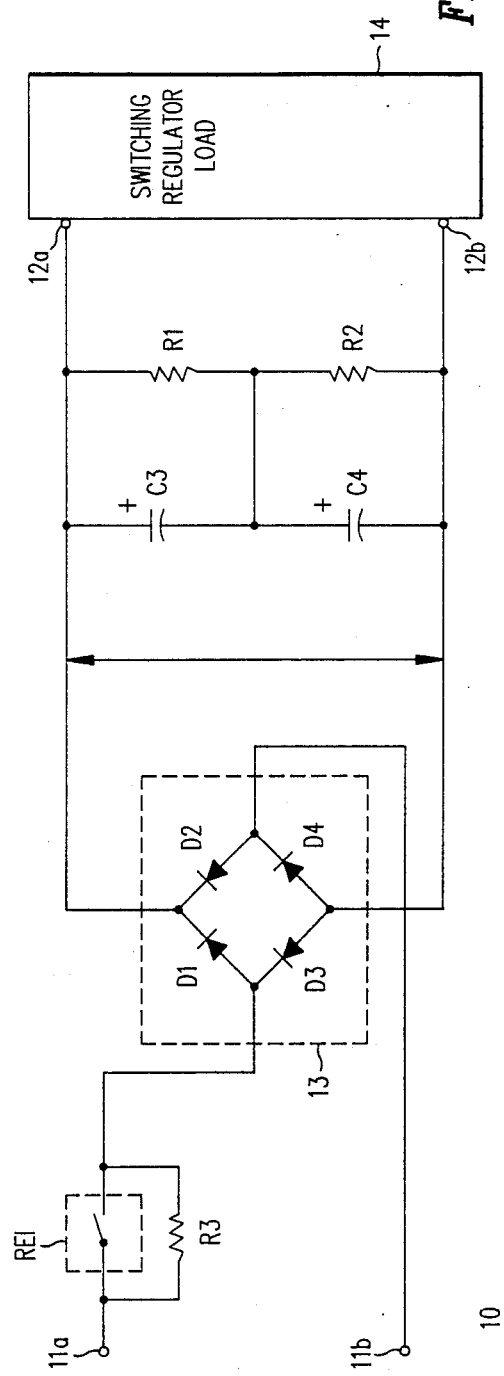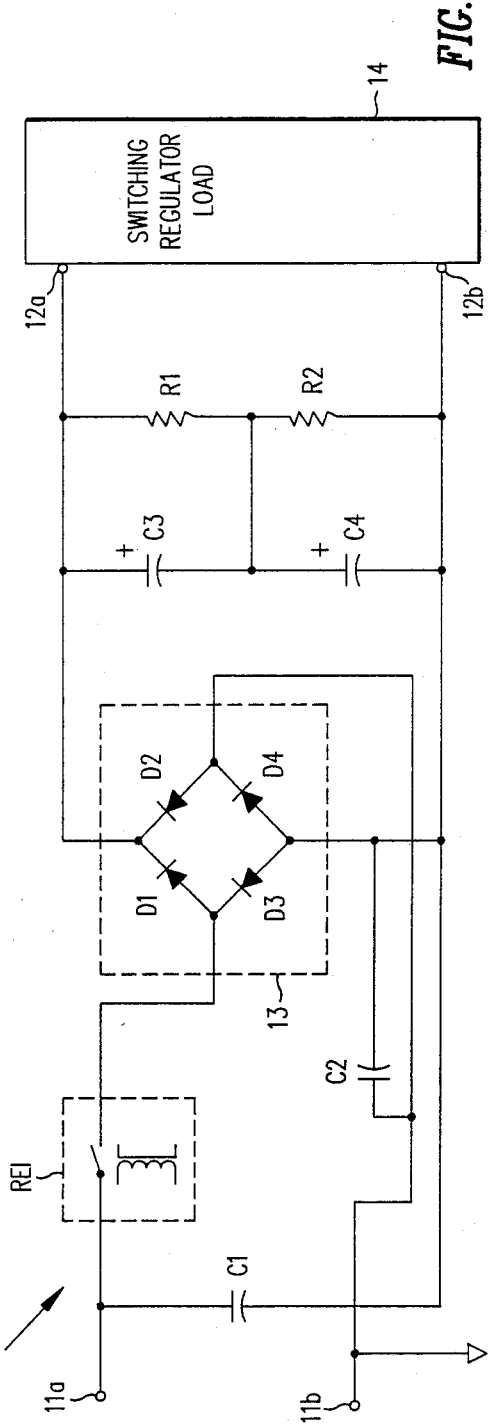

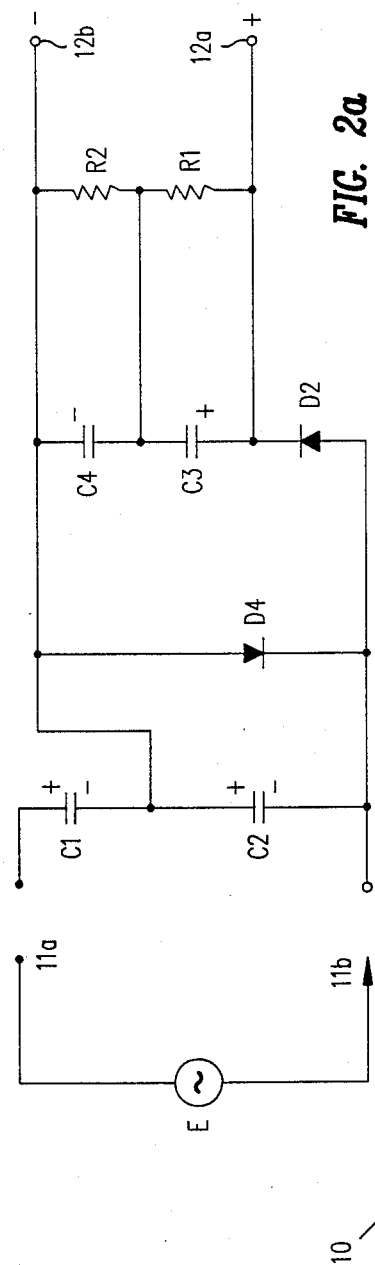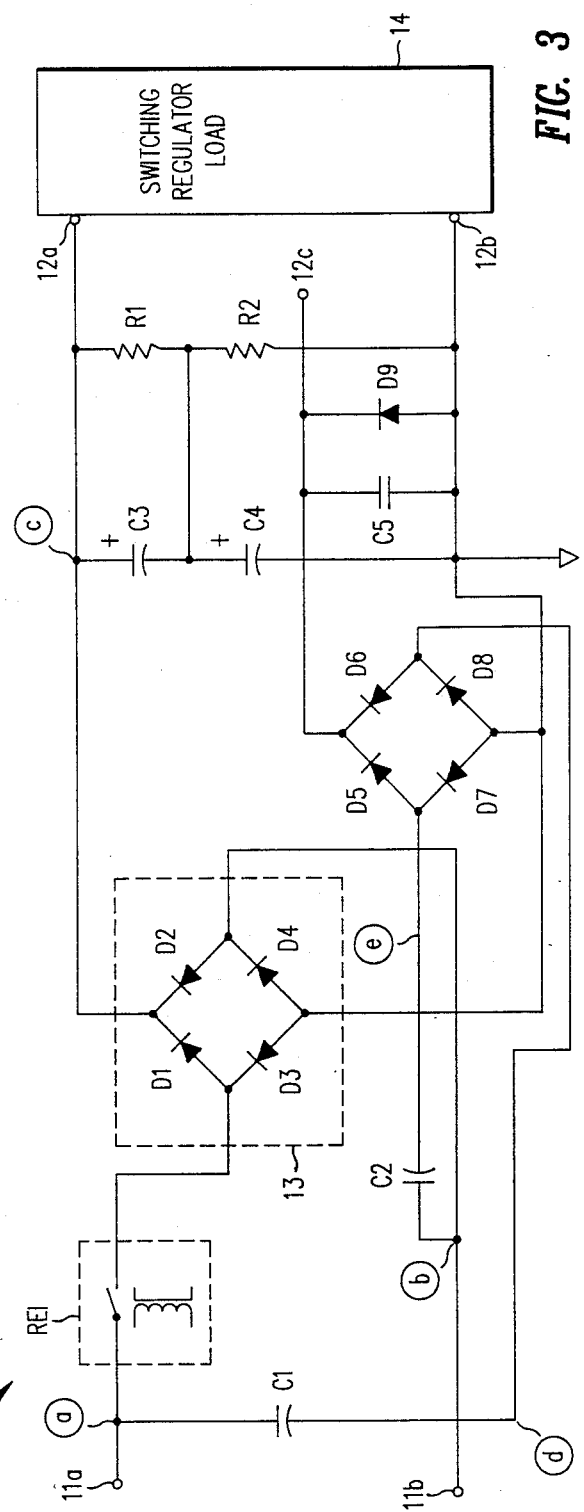
FIG. 2a
FIG. 3

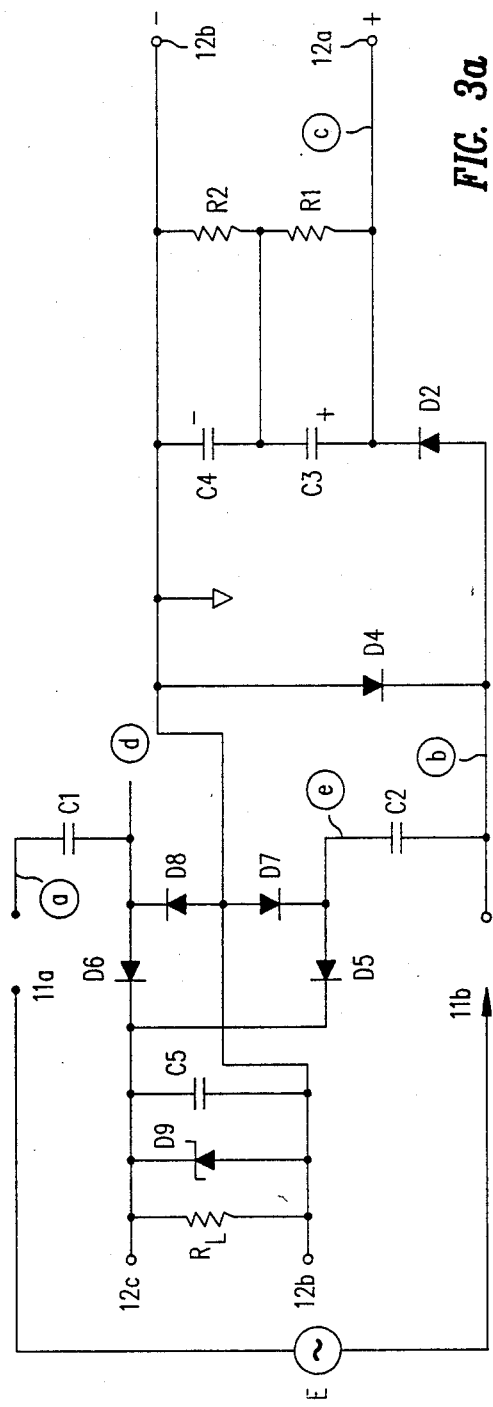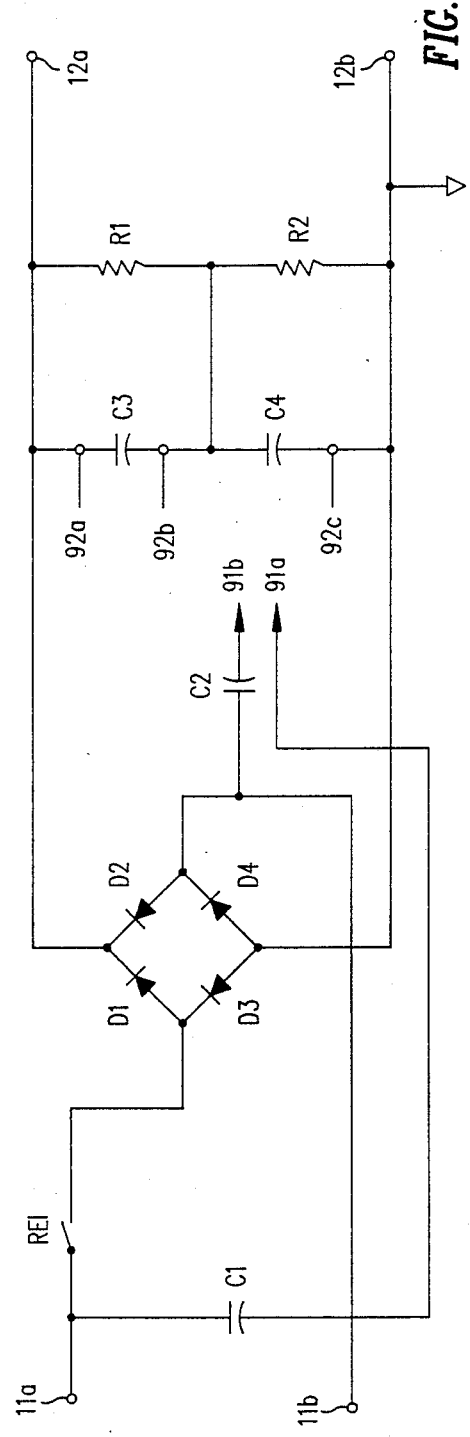
FIG. 3a
FIG. 9a

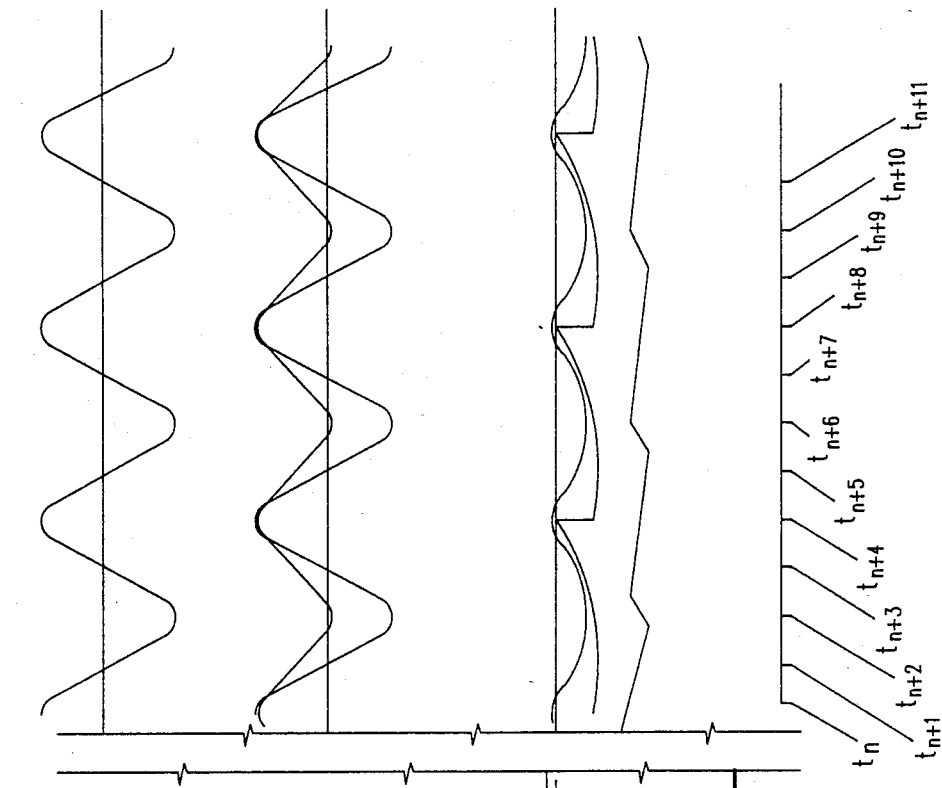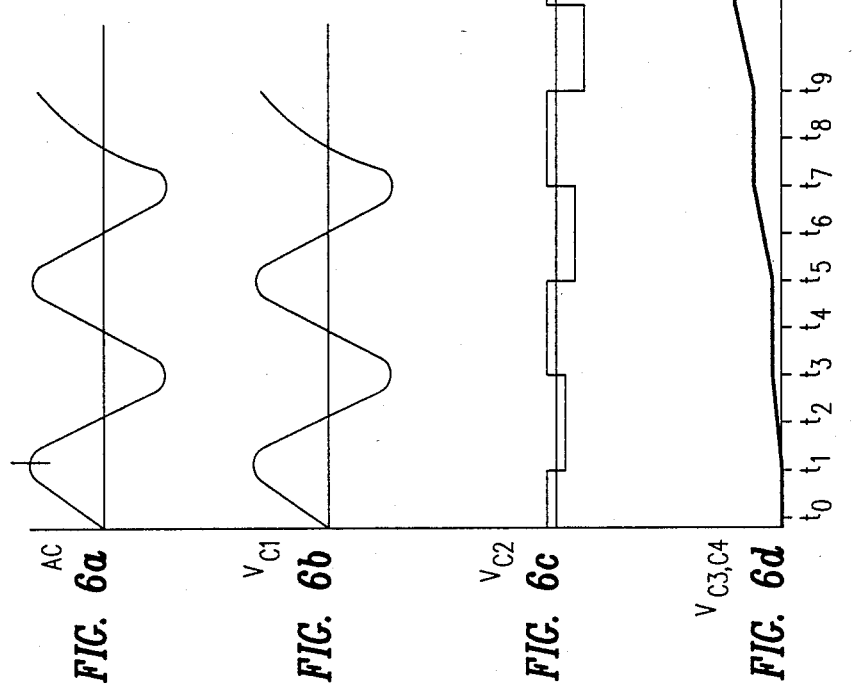

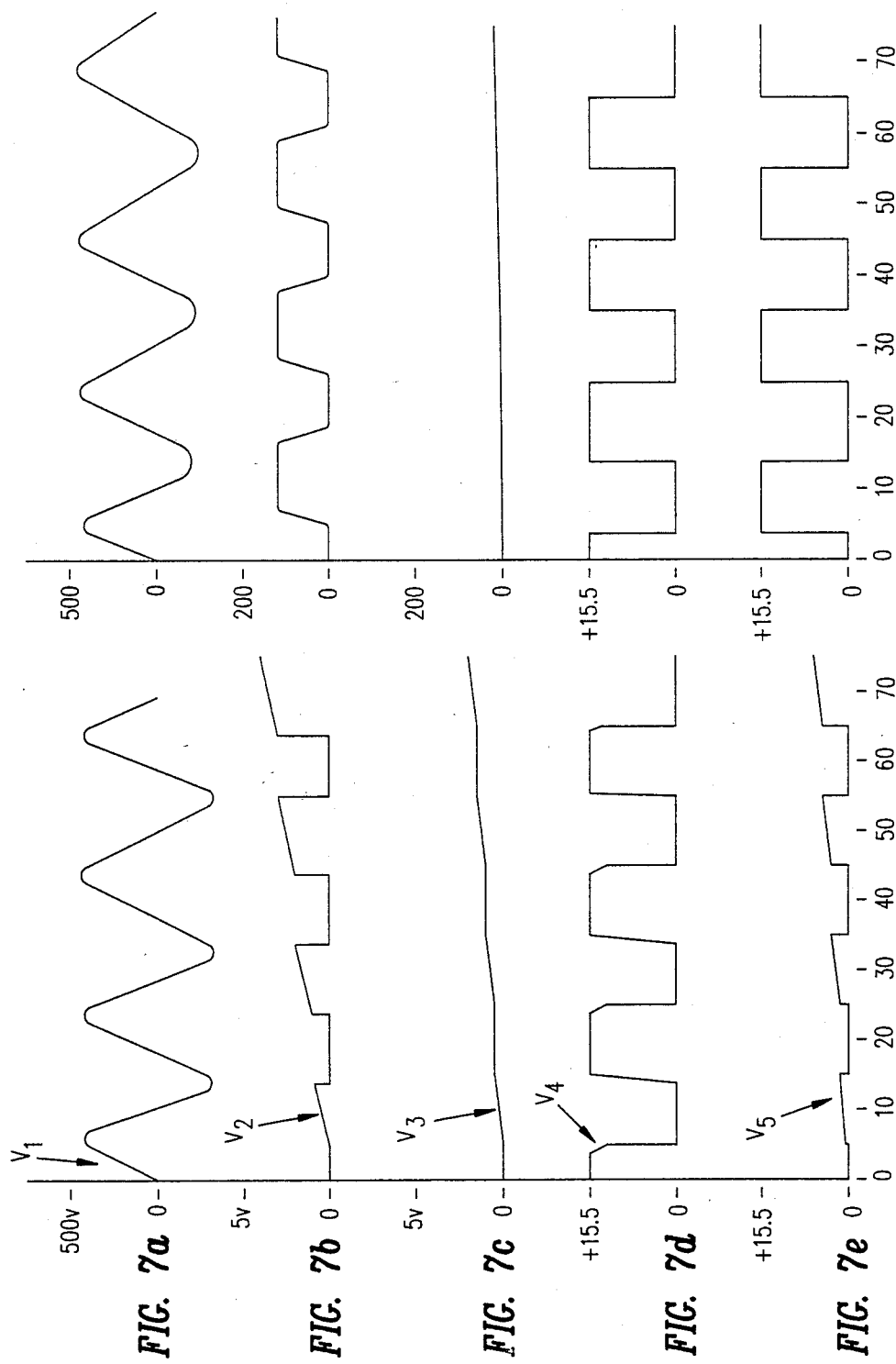

CURRENT LIMITING SCHEME FOR THE AC INPUT CIRCUIT TO A SWITCH MODE POWER SUPPLY

FIELD OF THE INVENTION

This invention relates to the input circuit to a switch mode power supply having an AC input power supply and in particular to a structure and method for preventing surges of current on turn-on of the AC input power to the switch mode power supply.

BACKGROUND OF THE INVENTION

Switch mode power supplies which take an AC power supply and convert the AC power supply to a DC voltage and current are well known. Typically, such power supplies include an AC to DC converter at the input which takes the AC power supply, rectifies the AC power and thereby converts the AC power to the DC power which then is applied to the switching regulator. The switching regulator then produces output voltage and current as required by the load. Typically, such a prior art circuit includes a rectifier. The rectifier might very well comprise a rectifying bridge as shown in FIG. 1 consisting of four diodes such as diodes D1, D2, D3 and D4 and storage capacitors such as capacitors C3 and C4 for storing the charge at a selected voltage which is then used to drive the switching regulator 14 of the switch mode power supply. The capacitors C3, C4 store the charge from the rectifier from cycle to cycle of the AC input power supply. When the switch mode power supply is turned on and an AC input voltage is suddenly applied to input terminals 11a and 11b, capacitors C3 and C4 have zero voltage across them and thus act as a short circuit. In response, a large rush of current passes through these capacitors. The full wave rectifier comprising diodes D1, D2, D3 and D4 passes a positive voltage to capacitors C3 and C4 with the result that these capacitors conduct a very large current. Typically, in the prior art a resistor R3 as shown in FIG. 1 is placed in series to input terminal 11a to limit the amount of current which can be drawn by the AC to DC input conversion stage of the switch mode power supply. Resistor R3 is typically placed in parallel with a relay RE1 which during the startup portion of the operation of the switch mode power supply is left open. When the capacitors C3 and C4 have substantially charged, relay RE1 is typically closed. If capacitor C3 and C4 are not fully charged, then a surge of current passes from input lead 11a to the full wave rectifier and the amount of this surge is inversely proportional to the size of resistor R3. Prior to the closing of relay RE1, the current on input lead 11a which passes through resistor R3 is rectified by the full wave rectifier and charges capacitor C3 and C4. Only that portion of the input voltage which is in excess of the voltage across capacitors C3 and C4 causes current to flow through resistor R3. However, capacitors C3 and C4 are continuously discharging through resistors R1 and R2. Consequently, to bring the voltage across capacitors C3 and C4 as close as possible to the intended voltage during normal steady state operation of the switch mode power supply, resistor R3 must be made quite small. At the same time, to effectively limit the input current during the initial start-up of the AC to DC conversion stage, resistor R3 should be quite large. Accordingly, there is a conflict in sizing R3 between the requirement that R3 be large to effectively limit the input current to the switch mode power supply during the initial portion of the start-up phase and be small to allow filter capacitors C3 and C4 (also called storage capacitors) to charge as closely as possible to the peak line voltage applied across input terminals 11a and 11b. In practice, the compromise between these two conflicting requirements on resistor R3 results in resistor R3 being made quite small. Typically, during normal operation the initial current surge across current limiting resistor R3 is for a sufficiently small time that R3 does not significantly heat above its design limits. However, if a load is prematurely connected to the switch mode power supply during the start-up phase or a short occurs in the switch mode power supply during the turning on of the power supply, then the initial current through resistor R3 lasts for a much longer period than originally intended and current limiting resistor R3 burns out.

SUMMARY OF THE INVENTION

In accordance with this invention, the problem of burning out the current limiting resistor connected to the input terminal of the AC to DC converter stage of the switch mode power supply is eliminated by removing this resistor and substituting a non-dissipative capacitive divider circuit which charges the filter or storage capacitors while the input relay is open. In accordance with this invention, charge pumping is employed to charge the voltage across the filter or storage capacitors to greater than the peak voltage of the AC input power source. When the output voltage across the storage or filter capacitors becomes greater than the peak input voltage, the relay connected to the input terminal is closed and the switching regulator of the switch mode power supply is then enabled to carry on its normal operations. The initial surge of current through the relay upon the closing of the relay is avoided and the circuit is not disabled should a load be prematurely applied to the switch mode power supply or a short circuit exist in the switching regulator.

This invention will be more fully understood in conjunction with the following detailed description taken together with the drawing.

DESCRIPTION OF THE DRAWING

FIG. 1 illustrates the circuit of the prior art with input current limiting resistor R3 in parallel with relay RE1;

FIG. 2 illustrates the circuit of this invention with current limiting resistor R3 eliminated and a capacitive divider circuit consisting of capacitors C1 and C2 substituted therefor.

FIG. 2a illustrates the circuit of FIG. 2 redrawn to show more the relationship between diode D4 and capacitor C2 in the voltage divider circuit comprising capacitor C1 and C2.

FIG. 3 illustrates the circuit of FIG. 2 with an additional rectifying circuit added to provide an internal source of low voltage DC power for use in operating the integrated circuit components of the switch mode power supply.

FIG. 3a illustrates the circuit of FIG. 3 redrawn to show more clearly the relationship between diode D4 and capacitor C2 in the voltage divider circuit comprising capacitor C1 and C2.

FIGS. 6a, 6c and 6d waveforms illustrating the voltage across input terminals 11a and 11b, across capacitor C1, across capacitor C2 and across capacitors C3 and C4 taken together, respectively in FIG. 2.

FIGS. 7a, 7b, 7c, 7d and 7e are waveforms illustrating the voltages at nodes A, B, C, D and E, respectively in FIG. 3.

FIG. 9a illustrates alternative ways of connecting capacitor C1 and C2 into the input rectifying circuit of a switch mode power supply.

FIG. 10a illustrates a higher power alternative to the internal power supply structure shown in FIGS. 3 and 3a.

FIG. 10b shows a special circuit for use as part of the internal source of low voltage DC power illustrated in FIGS. 3 and 3a.

DETAILED DESCRIPTION

Figure 4:
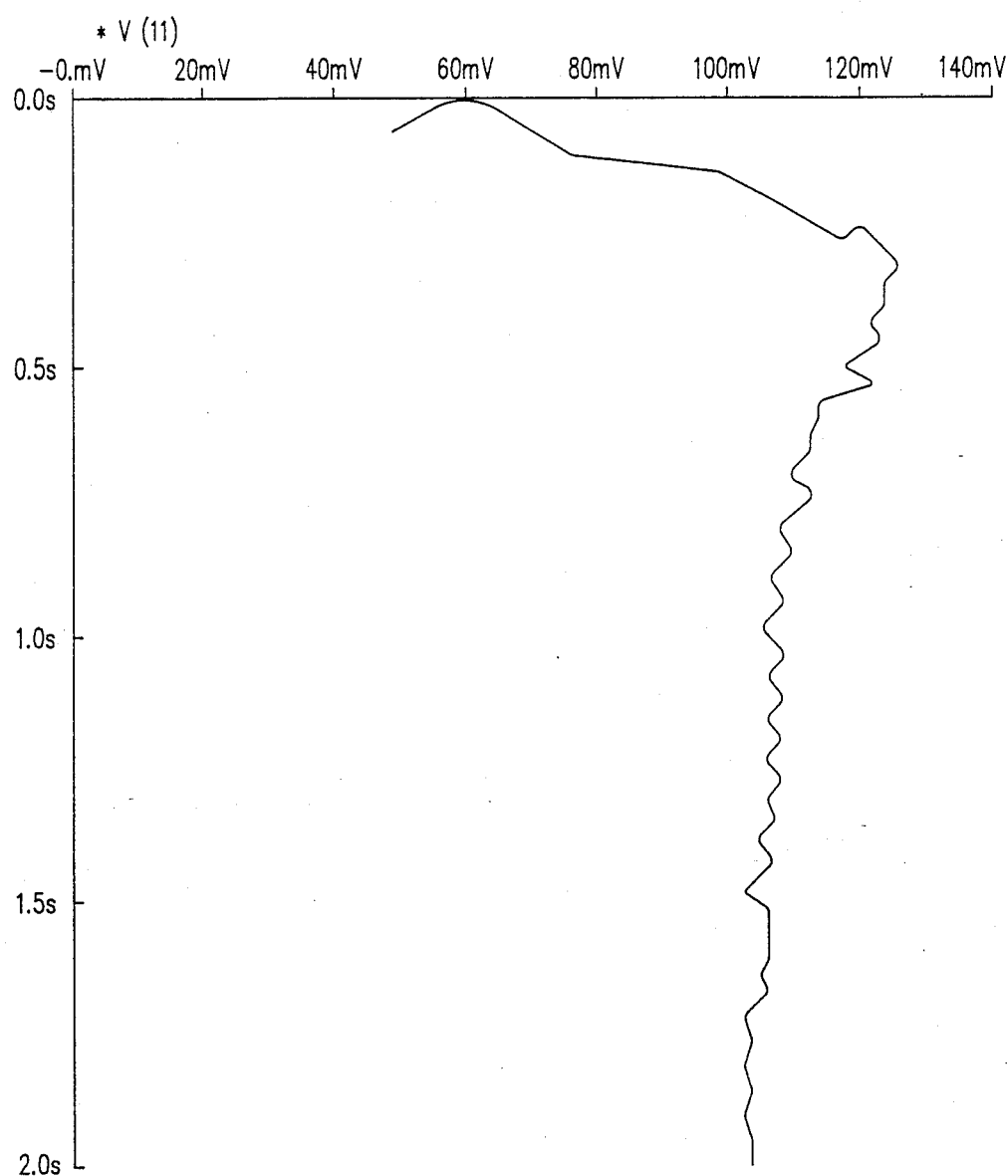
FIG. 4 illustrates the current available from the internal power supply illustrated in FIG. 3.

This invention will be described in conjunction with the embodiments shown in FIGS. 2 and 3. However, it should be understood that this description is illustrative only and not limiting.

FIG. 1 illustrates a typical prior art AC to DC conversion circuit used in the input stage of a switch mode power supply. In the structure of FIG. 1, AC input power is applied at input terminals 11a and 11b. During the start-up phase of operation of the switch mode power supply, relay RE1 is open as shown and the input current passes through input limiting resistor R3 to full wave rectifier of well-known design comprising diodes D1, D2, D3 and D4 connected as shown. The rectified wave form from the diode bridge 13 is then applied to storage and filter capacitors C3 and C4 connected in series across the output terminals of the diode bridge. Resistor R1 and R2 are also connected in series across the output terminals of the diode bridge and the node between resistor R1 and R2 is connected electrically to the node between capacitors C3 and C4. Resistors R1 and R2 are bleeder resistors required by safety codes to allow the charge stored on capacitors C3 and C4 to discharge when switch mode power supply of which the input circuit is a part is turned off. Sometimes, resistors R1 and R2 can be in series with a switch which prevents current from discharging from capacitors C3 and C4 during the normal operation of the power supply. This switch allows resistors R1 and R2 to conduct when the switch mode power supply is turned off but otherwise prevents the two resistors R1 and R2 from conducting. This switch therefore prevents power from being dissipated during the normal operation of the switch mode power supply.

The load comprises the switching regulator portion 14 of the switch mode power supply. The actual load to be driven by the DC output signal of the switch mode power supply is not shown in this drawing but would be connected downstream from the switching regulator 14 in a well known manner.

During start-up operations, the input current passes through resistor R3 and then through full wave rectifying bridge 13 to charge capacitor C3 and C4. Initially, upon turning on of the power supply, the voltage across capacitors C3 and C4 is zero. Accordingly, current initially surges from a rectifying bridge across capacitors C3 and C4. Resistor R3 limits that current surge to a selected maximum value given by the maximum line voltage across terminals 11A and 11B divided by the value of resistor R3. Typically, capacitors C3 and C4 charge fairly rapidly (often in less than a second) so the maximum current surge through resistor R3 lasts only for a small period of time, typically a fraction of a second. Should, however, the switch mode power supply prematurely begin driving its load or should switching regulator 14 of the switch mode power supply have a short circuit, then capacitors C3 and C4 will charge more slowly and the maximum current surge across resistor R3 will last for a much longer period of time than resistor R3 is designed to withstand. Accordingly, resistor R3 will heat up and burn out thereby causing a failure of the switch mode power supply. In normal operation resistor R3 survives the initial turning on of the switch mode power supply, but the maximum voltage charged across capacitors C3 and C4 will be reduced from the peak voltage of the AC input source because of the presence of resistor R3. At some point during the start up operation, relay RE1 is closed in response to the voltage across capacitor C3 and C4 reaching some preselected value or to a selected time elapsing from the turn-on of the AC input power source or to some combination of these two measures. The current surge through relay RE1 upon closure depends upon how close the voltage across capacitor C3 and C4 is to the peak line voltage. The larger R3, the further the voltage across capacitors C3 and C4 is from the peak line voltage and thus the greater the current surge through relay RE1 upon its closure. Accordingly, to minimize this current surge, resistor R3 wants to be made quite small. The result is that resistor R3 becomes quite sensitive to prolonged applications of full line voltage resulting from premature loading of the switch mode power supply or from short circuits within the switch mode power supply. Consequently, resistor R3 is sensitive to burning out.

In accordance with this invention, resistor R3 is replaced by capacitors C1 and C2 connected as a voltage divider as shown in FIG. 2. Capacitors C1 and C2 are very small relative to capacitors C3 and C4. Typical values of capacitors C1 and C2 are 2.2 $\mu f$ and 1.0 $\mu f$, respectively, while typical values of capacitors C3 and C4 are 4,000 $\mu f$ each.

To understand the operation of the circuit of FIG. 2, it helps to refer to FIG. 2a, which is the circuit of FIG. 2 redrawn to eliminate relay RE1 and diodes D1 and D3 which are not used in the circuit until relay RE1 closes at the end of the start up. Assume that the power supply is switched on at the time the external power E applied to terminals 11a and 11b is just passing through zero volts on a positive upward swing. The voltage across capacitor C1 will follow the voltage from the power supply applied to terminals 11a and 11b with the exception that it will be about 0.7 volts less once the initial voltage applied to terminals 11a and 11b is greater than the turn-on voltage of diode D4. At that point, should the voltage applied to terminals 11a and 11b have a peak value of about 310 volts (corresponding to a 220 volt AC power source) then until the peak voltage of the first half cycle is reached, the voltage across capacitor C1 tracks, but is about 0.7 volts less than, the input power supply voltage as shown in FIGS. 6a and 6b, respectively. When the power supply voltage starts declining from its peak at time $t_1$ (FIG. 6a) during the first positive half cycle, the voltage on capacitor C1 likewise attempts to follow the power supply voltage. To do so, however, the charge across capacitor C1 discharges through the AC power supply. Initially during the positive slope of the AC input signal, the voltage across capacitor C2 has been limited to 0.7 volts maximum (measured positive at the node between diodes D3 and D4). Shortly after time $t_1$, diode D4 is back biased to minus 0.7 volts and thus the current flowing through capacitor C1 must pass through diode D2 in the full wave rectifying bridge and through capacitors C3 and C4 thereby charging capacitors C3 and C4 positively as desired for operation of the AC to DC rectifying stage of the switching mode power supply. Because capacitor C1 is only about 2.2 μf whereas capacitors C3 and C4 are each about 4,000 μf, only a small amount of charge is deposited on capacitors C3 and C4. During the negative half cycle of the power supply beginning at time $t_2$ (FIG. 6a), the voltage across capacitor C1 becomes negative and the current necessary to provide the charge across capacitor C1 to generate voltage is also passed through diode D2 and capacitors C3 and C4 to further build up the positive charge on capacitors C3 and C4. Indeed, all the time that the input power supply voltage has a negative slope in the first cycle of the AC input signal (i.e., the time between $t_1$ and $t_3$ in FIG. 6a), the current flows from terminal 11b through diode D2, capacitors C3 and C4, and then through capacitor C1 to terminal 11a thereby positively charging capacitors C3 and C4. While some current also flows through bleeder resistors R1 and R2, this current is relatively small because the time constant $(R1+R2)(C3C4)/C3+C4)$ is many times the period of one cycle of the AC input signal. In one embodiment, this time constant is 40 seconds.

At time $t_3$, the input power supply voltage E changes to a positive slope and heads positive again. Capacitor C1 again is charged positively. However, the charge on capacitors C3 and C4 is unable to discharge because diode D2 becomes back biased. While a small amount of charge escapes from capacitors C3 and C4 through bleeder resistors R1 and R2, resistors R1 and R2 are 10 K ohms or larger and therefore the amount of charge leaking from capacitors C4 and C3 is relatively small. At the end at time $t_3$ of the negative going portion of the first cycle of the input AC signal (corresponding to the portion of the input signal shown in FIG. 6A between times $t_1$ and $t_3$) the voltage across capacitor C1 is not the voltage across terminals 11a and 11b but rather is the voltage across these terminals less the forward biased turn-on voltage across diode D2 (approximately 0.7 volts) plus the voltage across capacitors C3 and C4 (which during the initial cycle of AC input current is quite small (typically about 3/10ths of a volt for the particular component values selected)). The voltage on the node between capacitor C1 and diode D4 at time $t_3$ is about minus 1 volt beneath the voltage on the node between diodes D4 and D2 at time $t_3$. This voltage is the sum of the approximately 0.7 voltage drop across diode D2 plus the approximately 0.3 volts drop across capacitor C3 and C4 taken together. Thus, when the AC input signal starts going positive at time $t_3$ (FIG. 6a) diode D4 will not begin conducting until the AC input signal has risen about 1.7 volts (reflecting the minus 1 volt back bias across diode D4 plus the 0.7 volt forward bias required to turn on diode D4. When diode D4 begins to conduct, current then passes from input terminal 11a through capacitor C1 through diode D4 to terminal 11b. During the remaining positive half cycle, the voltage on capacitor C1 tracks the voltage across terminals 11a and 11b but is 0.7 volts less than this voltage due to the 0.7 volts forward bias across diode D4. During this time, capacitors C3 and C4 do not further charge, but rather the voltage across capacitors C3 and C4 remains substantially constant or indeed due to the presence of bleeder resistors R1 and R2, declines slightly as shown in FIG. 6d.

Figure 5:
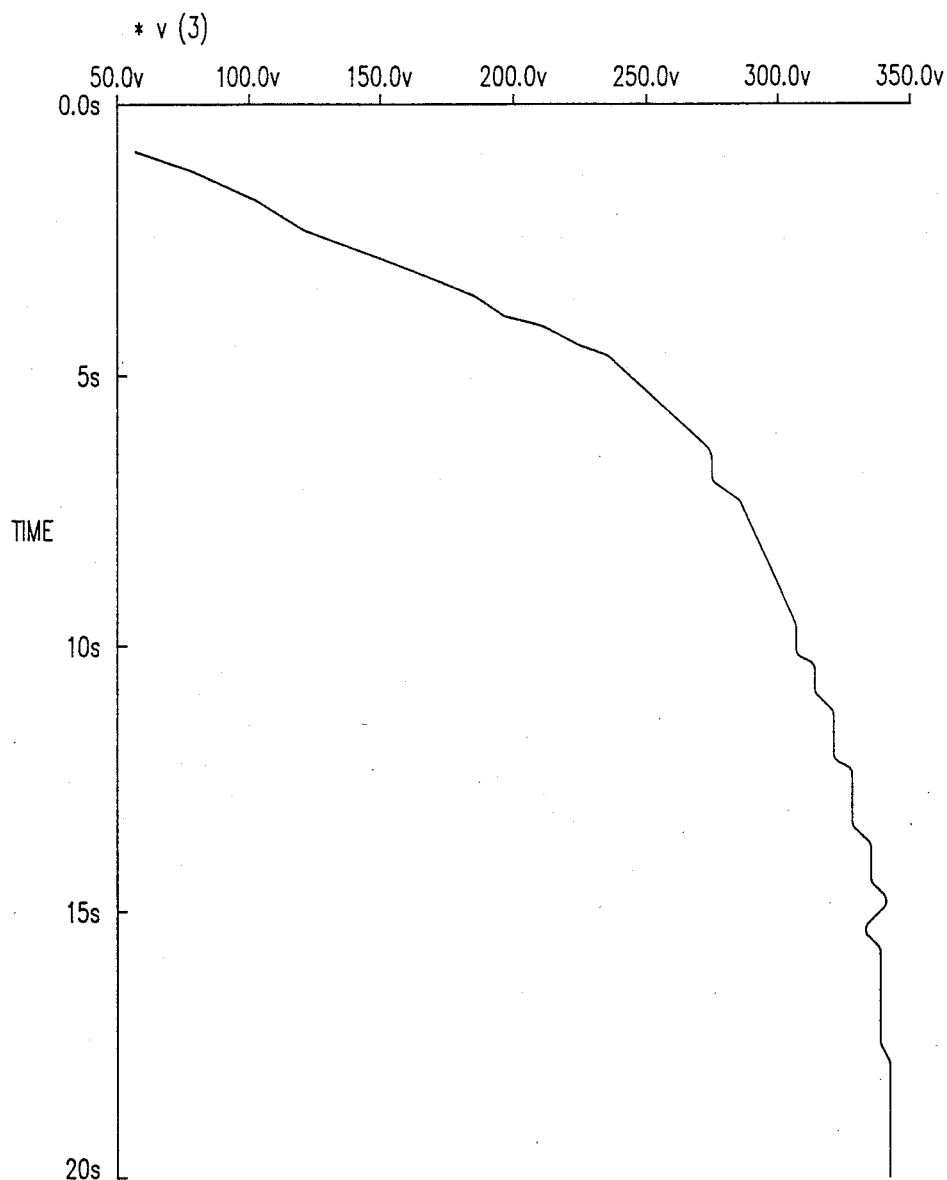
FIG. 5 illustrates the ramp up of voltage across storage capacitor C3 and C4 illustrated in FIGS. 2 and 3 as a function of time during the turn-on of the switch mode power supply.

In subsequent cycles of the AC input signal, during the times that this input signal has a negative slope, further current is conducted through diode D2 and capacitors C4 and C3 to further charge these capacitors. This conduction process repeats 60 times per second for an input power frequency of 60 Hertz with the result that after typically 15 to 20 seconds, the voltage across capacitors C3 and C4 becomes sufficiently positive to allow relay RE1 to be closed. This voltage is shown as a function of time in FIG. 5 and 6d. FIG. 6d shows that the voltage on capacitors C3 and C4 increases during the time period that the AC input power source has an input voltage with negative slope and then declines slightly due to the current through bleeder resistors R1 and R2 during the times that the AC input signal has a positive slope. FIG. 5 shows the voltage across capacitor C3 and C4 as a function of time. As shown in FIG. 5, typically, approximately 15 to 20 seconds are taken for the voltage across capacitor C3 and C4 to approach the final value of the voltage required on terminals 12a and 12b to drive the load 14 (FIG. 2) associated with the input rectifier of the switch mode power supply.

Note that during the negative sloped portion of each cycle of the input power supply (see FIG. 6a) no substantial current flows through capacitors C3 and C4 until the voltage from the input power supply E drops beneath the positive peak voltage by the amount of the voltage drop across diode D2 and capacitors C3 and C4. For example, as the voltage drops at time $t_5$ from its peak positive value, the voltage across capacitor C1 only changes due to a small current through capacitors C1 and C2, since diode D4 is now back biased off and diode D2 is also back biased. No substantial current will flow through capacitor C1 until diode D2 becomes forward biased. As the voltage on terminal 11a drops subsequent to time $t_5$ from its peak positive value, diode D2 will only become forward biased when the voltage on terminal 11a has dropped from its peak value by an amount equal to the forward bias turn-on voltage of diode D2 (0.7 volts) plus the voltage across capacitor C3 and C4 plus the amount diode D4 was forward biased (about 0.7 volts). Accordingly, diode D2 will only conduct following time $t_5$ when the voltage on input terminal 11a drops from its peak value by about 1.7 volts. At that point, diode D2 begins to conduct current which charges further capacitors C3 and C4 and capacitor C1. Actually the voltage must even drop further due to the capacitive divider effects of capacitors C1 and C2.

Referring again to FIG. 6a through 6d. As time goes on, the time necessary for diode D2 to conduct during the negative going slope of the input power supply becomes larger and larger as shown in FIG. 6c. The voltage across capacitor C2 becomes larger and larger with time reflecting the positive voltage across capacitor C3 and C4 which must be overcome before diode D2 becomes forward biased. Thus during the times between $t_n+4$ and $t_n+6$, for example, or $t_n+8$ and $t_n+10$, for example, the voltage across capacitor C2 is gradually made more negative until during a period of time just before time $t_n+6$ or time $t_n+10$ when diode D2 becomes forward biased and conducts additional charge to thereby recharge capacitor C3 and C4 an amount just required to meet the current drawn by bleeder resistors R1 and R2. At some point in time such as time $t_{(n+12)}$, relay RE1 is closed. At this point the rectifying circuit goes into its normal operation and the load 14 which consists of the switch mode power supply can be turned on and provide power to the equipment which it is designed to operate.

Once relay RE1 is turned on, capacitor C1 and C2 still are of importance to the circuit. Thus, by selecting properly the values of capacitors C1 and C2 the maximum value of voltage to which capacitor C3 and C4 can be charged is controlled. For example, if capacitor C2 was zero value (i.e., capacitor C2 was removed) and bleeder resistors R1 and R2 were also removed, then the maximum voltage across capacitor C3 and C4 would be 1.4 volts less than twice the maximum peak input supply voltage. Thus, if the input voltage E has a maximum positive value of 310 volts, then the voltage across capacitor C3 and C4 would be 620 volts minus 1.4 volts or 618.6 volts. This occurs because capacitor C2 has been removed. Then during the negative slope portion of each cycle of the output signal from generator E, the voltage generated across capacitor C1 during the positive slope portion of this cycle remains across this capacitor until the input voltage drops to a sufficient level to turn on diode D2. When capacitor C1 is charged at 310 volts and capacitor C4 and C3 are charged for example to 310 volts, this requires the input voltage on terminal 11a to drop to 0.7 volts relative to the input voltage on terminal 11b. At this point diode D2 forward biases and current is conducted through capacitor C3 and C4 and C1 thereby further charging capacitor C3 and C4 above 310 volts while discharging capacitor C1. Ultimately, the voltage across capacitor C3 and C4 will be almost double the input voltage. Thus, this circuit also functions as a charge pump. By making capacitor C2 equal to capacitor C1, the voltage across capacitor C3 and C4 would approach the peak positive voltage of the AC input signal E. However, the voltage across capacitor C3 and C4 would never reach this positive voltage because of the effect of bleeder resistors R1 and R2. Thus by making capacitor C2 somewhat smaller than capacitor C1 a charge pump effect is created which brings the voltage across C3 and C4 up to or even slightly above the peak positive voltage of the input power supply E. Then when the load 14 (the switch mode power supply) is turned on, the voltage at terminals 12a and 12b will drop to the desired DC voltage level. Once relay RE1 is closed, the full wave diode rectifying bridge comprising diodes D1, D2, D3 and D4 (FIG. 2) will provide the desired peak voltage across capacitor C3 and C4. Should, however, the current drawn by the load 14 decrease substantially, then capacitor C1 and C2 will provide a further charge pump effect which will bring the voltage across capacitor C3 and C4 above the desired output voltage on terminals 12a and 12b of the circuit.

The operation of the circuit of FIG. 2 can be understood if one assumes for a moment that capacitor C2 is not present. Then, when the input supply voltage is at its peak positive value, capacitor C1 will have across it a positive voltage equal to the peak input voltage less the 0.7 volt drop across diode D4. When the input power supply voltage on node 11a starts dropping from its peak positive value, capacitors C3 and C4 have a positive voltage across them. If, for example, capacitors C3 and C4 have been charged such that the total voltage across them is also equal to the positive line voltage (with terminal 12a being positive relative to terminal 12b), then current will not flow through diode D2 and capacitor C1 will not discharge until the input voltage applied to terminal 11a drops about 0.7 volts beneath zero. At that point, capacitor C1 will begin to discharge but the voltage across capacitors C3 and C4 will increase in response to the charge transferred to these capacitors as a result of the discharge of capacitor C1. After a number of cycles, the charge across capacitors C3 and C4 would, in fact, be such that the voltage across capacitors C4 and C3 would be just about double the peak input line voltage. The presence of capacitor C2 reduces this effect.

An advantage of this invention is that in the switching regulator portion of the power supply an integrated circuit is often used for controlling the operation of the switching regulator. This integrated circuit requires a DC power supply of typically 10 volts to 15 volts. This internal power can be obtained from the circuit of this invention simply by adding diodes and a filter capacitor to the circuit shown in FIG. 2. The structure is shown in more detail in FIG. 3. As shown in FIG. 3, this internal power supply can be generated by having the connection between C1 and C2 comprise another full wave rectifier such as a diode bridge consisting of diodes D5, D6, D7 and D8. One plate of capacitor C1 is connected to the node between diodes D6 and D8 while one plate of capacitor C2 (the plate to which this plate of C1 was previously connected) is connected to the node between diodes D5 and D7. The output terminals from this diode bridge are taken from the node between diodes D7 and D8 for the common and the node between diodes D5 and D6 for the 15 volt power supply. Filter capacitor C5 has the voltage on it controlled by zener diode Z1 which breaks down at the desired output voltage (typically 15 volts) to regulate the voltage on capacitor C5 to its proper value. The output voltage from this internal power supply circuit is taken from terminal 12C and is used to provide power for the internal operation of the power supply.

Of importance, in the preferred embodiment capacitors C1 and C2 are sized to be approximately 2.2 $\mu$f and 1.0 $\mu$f to allow these capacitors to work both with 60 cycle power and 50 cycle power. In order to allow these capacitors to work with various frequency power supplies they must be made larger than would otherwise be required. This is required because the current through the capacitors should be larger than the current through R1 and R2 to allow the capacitors to function as a voltage divider. With large current, large capacitors are required.

Figure 8:
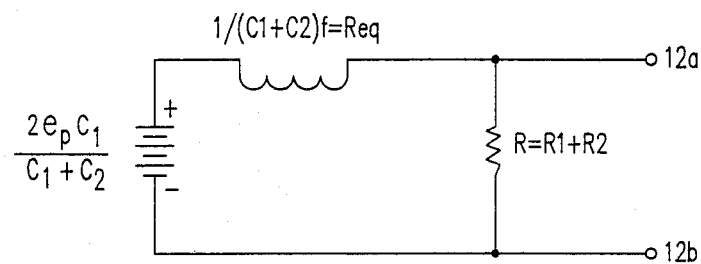
FIG. 8 shows an equivalent DC circuit for the input rectifying circuit shown in FIG. 2 and in FIG. 3.

FIG. 8 illustrates the DC equivalent circuit for the AC input circuit of FIGS. 2 and 3. In FIG. 8, the DC voltage source has a value $2e_pC2/(C1+C2)$. $e_p$ equals the peak voltage of the AC input signal E. C1 and C2 are the values of capacitors C1 and C2 shown in FIGS. 2, 2a and 3. The resistor $R_{eq}$ is an equivalent resistor whose value is given by $1/(C1+C2)f$ where f is the frequency of the input signal. The resistor $R=R1+R2$. The current through resistors $R_{eq}$ and R for terminals 12a and 12b open circuited is given by $V=(R+R_{eq})I$ substituting from the values of each parameter given in FIG. 8 it can be shown that the current I equals $[(2e_pC1)/(C1+C2)]\times[1/(R+1/(C1+C2)f)]$. Thus it can be seen that for the frequency dependent resistance $R_{eq}$ to be made relatively small compared to the pure resistance R, C1 and C2 must be made adequately large. This will decrease the frequency sensitivity of the output voltage due to the presence of capacitors C1 and C2. The values of C1 and C2 were stated above to be in the microfarad range. Typically, C2 will want to be made smaller than C1. As stated above, in the preferred embodiment suitable for use with an input supply voltage of about 220 volts RMS (310 volts peak) C1 was 2.2 microfarads and C2 was 1 microfarad.

FIG. 3 illustrates the circuit of this invention in combination with diodes D5, D6, D7 and D8, capacitor C5 and zener diode D9 to produce an internal voltage source on terminal 12C for supplying relatively low voltage power for the integrated circuit components used in switch mode power supply comprising load 14. A simplified version of FIG. 3 useful in understanding the operation of this invention with this additional function is illustrated in FIG. 3a. The operation of the circuits of FIGS. 3 and 3a will be explained in conjunction with FIGS. 7a, 7b, 7c, 7d and 7e which illustrate the waveforms at nodes a, b, c, d and e, respectively. The addition of the internal power supply components to the circuit of FIG. 2 to provide the circuit of FIG. 3 has a small effect on the operation of the circuit but basically does not affect the ability of the circuit to produce the required output voltage across capacitors C3 and C4. In operation, the voltage at node e is shown in FIG. 7e to be a maximum of 15.5 volts above the voltage on terminal 12b which is the ground for the internal circuit of the switch mode power supply. The voltage on node d is illustrated in FIG. 7d and is 15.5 volts above the reference voltage on terminal 12b. The output voltage from the circuit on node c (corresponding to terminal 12a) is shown in FIG. 7c and has the same general characteristics as described above in conjunction with FIG. 6d. In operation, the AC waveform at node d when positive relative to system ground on terminal 12b forward biases diode D6 and charges storage capacitor C5. Zener diode D9 breaks down at a voltage of about 15 volts thereby requiring a voltage on node d of about 15.5 volts taking into account the forward bias drop of diode D6 before breaking down. While a diode has been described above as having a forward bias voltage drop of about 0.7 volts, this forward bias voltage drop reduces to about 0.5 volts when the diode is made quite large. In the computer model used to generate the waveforms shown in FIGS. 7d and 7e, diodes D5, D6, D7 and D8 such as to have a forward bias voltage of 0.5 volts. Accordingly, the capacitor C5 will charge to the breakdown voltage of zener diode D9. The load, represented in FIG. 3a by resistor $R_L$, represents the resistance seen by the circuit due to the presence of the various integrated circuits and other components which are driven by this internal power supply.

During the start up of the switch mode power supply, when relay RE1 is open, the voltage from nodes e to b is as shown in FIG. 7e. Initially, during the positively sloped portions of the signal from the AC input power supply E, the voltage across capacitor C2 is about +0.2 volts since the voltage across C2 plus diode D7 must be equal to the 0.7 volt forward biased drop across diode D4. During the times that the waveform input power supply E has negative slope, the voltage from node e to terminal 12b increases slightly with time reflecting the storage of charge on capacitors C3 and C4 such that terminal 12a (node c) is biased positive relative to terminal 12b. During the first few cycles of the input waveform (corresponding to approximately the first 60 or 70 milliseconds), the voltage on node e steps up gradually during the negatively sloped portions of the input waveform reflecting the gradual storage of charge on capacitors C3 and C4.

When the charge on capacitors C3 and C4 exceeds 15.5 volts then current actually flows through diode D5 and the zener diode D9 breaks down thereby ensuring that the internal integrated circuits have a 15 volt power supply. Prior to this time the main current through zener diode D9 is supplied during the positively sloped portions of the input waveform from the AC input power supply. FIGS. 7a through 7e illustrate the waveforms at nodes a through e respectively for the first 70 milliseconds after start up and when the voltage across C3 and C4 has reached 100 volts and is still climbing.

FIG. 9a is identical in structure to the circuitry of FIG. 2 except that one plate of each of capacitors C1 and C2 is shown with a floating connection. The floating connections of 91a and 91b of capacitor C1 and C2 respectively can be connected in any combination to terminals 92a, 92b and 92c connected to the various plates of capacitor C3 and C4. Thus, for example, terminal 91a can be connected to terminal 92a and terminal 91b can be connected either to terminal 92b or 92c and the system will function substantially as described. However, alternatively, terminal 91b can be connected to either terminal 92b and terminal 91b can be connected to either of the other two terminals. Finally, both terminals 91a and 91b can be connected together and to any one of terminals 92a, 92b and 92c and the circuit will also work as described. While it might not be intuitively obvious that this is the case, in essence, C1 and C2 function as an AC capacitive voltage divider circuit across the AC input terminals 11a and 11b and the connection of other components with the low impedance at line frequency in series with these two between terminals 11a and 11b does not effect substantially the operation of components C1 and C2.

Figure 9B:
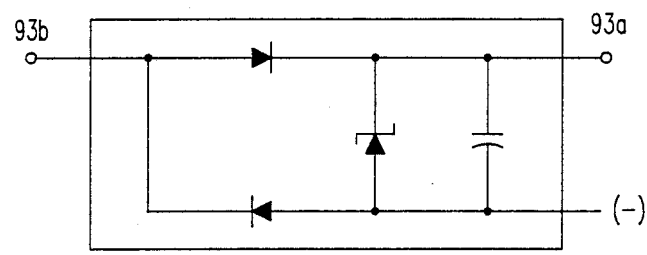
FIG. 9b illustrates the circuitry that can be used in conjunction with FIG. 9a to provide an internal power source for the integrated circuits used in a switch mode power supply where the power source produces a negative of the voltage.
Figure 9C:
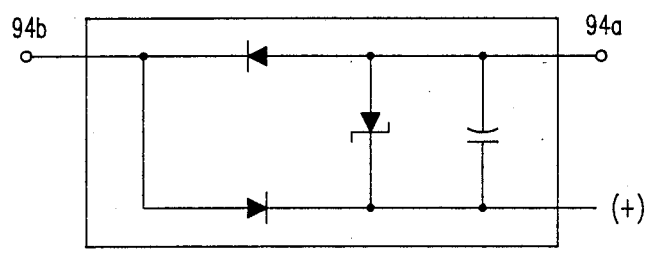
FIG. 9c illustrates circuitry which can be used as an internal power source to generate a positive output voltage for powering the integrated circuits and other components used in a switch mode power supply.

To connect in the power supply of FIG. 9b so that a negative voltage is obtained, terminal 93a is connected to any one of terminals 92a through 92c and terminal 93b is connected to any one of terminals 91b and 91a, or both such terminals. To obtain a positive power supply voltage for use in operating internal integrated circuits and components of the switch mode power supply, the circuit of FIG. 9c is used. In this case, terminal 94a is connected to any one of terminals 92a, 92b or 92c and terminal 94b is connected to either terminal 91b, 91a or both.

Figure 10A:
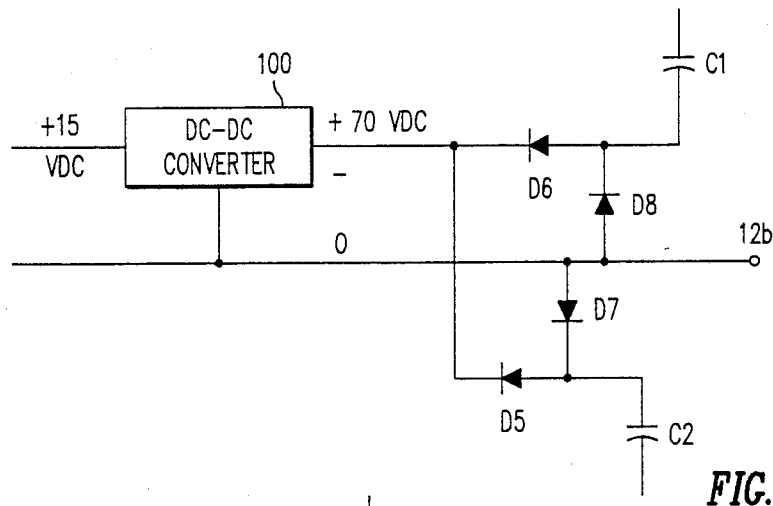
Figure 10B:
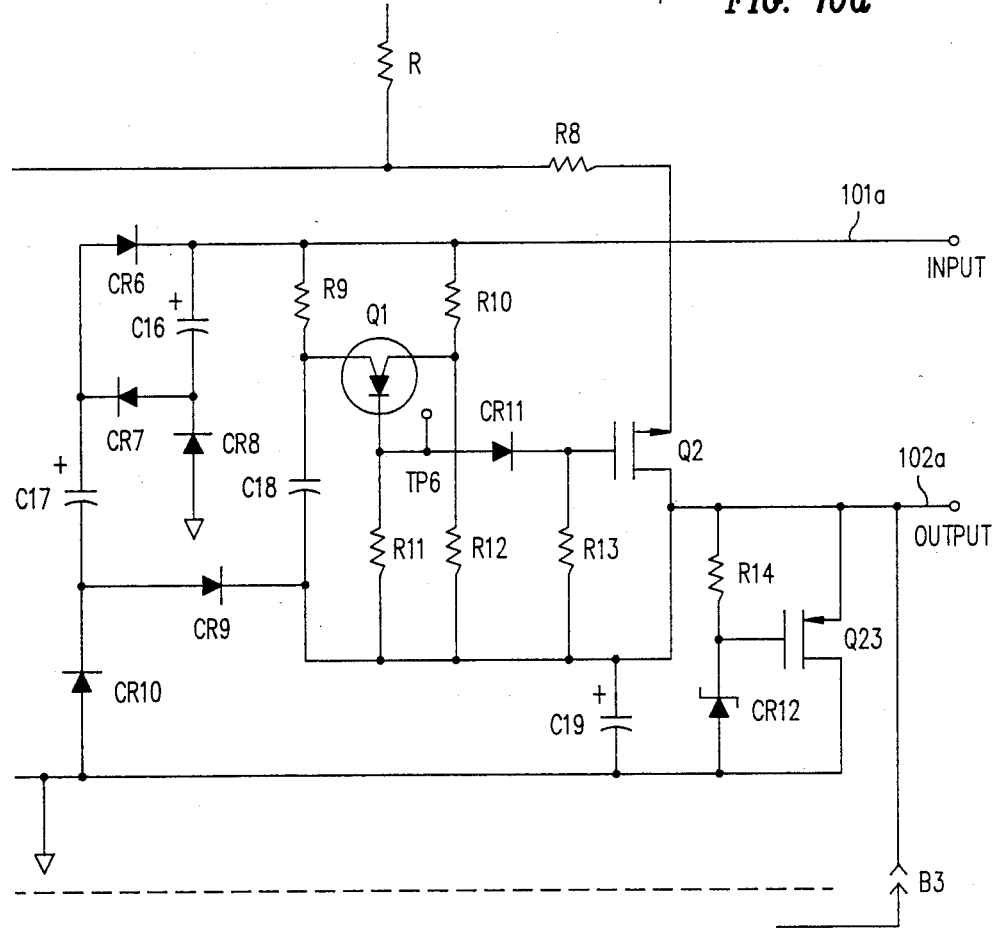

FIG. 10a illustrates a higher voltage alternative embodiment for the internal power supply shown in FIGS. 3 and 3a. FIG. 10b illustrates the circuit of this invention which is actually used in box 100 in FIG. 10a to convert the 70 volt DC signal generated by the internal power supply utilized in this invention to the 15 volt DC signal required to run the integrated circuits contained internally with the switch mode power supply. In FIG. 10b the values of the components and in some cases the particular power ratings of the components are listed. The circuit of FIG. 10b is utilized in a switch mode power supply made in accordance with this invention to generate an internal power supply signal of about 20 volts which is further regulated down to about 15 volts. In operation, an input signal is brought in on the input lead 101a and is used to charge capacitors C16, C17 and C19 connected in series. The charging current flows through capacitor C16, diode CR7, capacitor C17, diode CR9 and then capacitor C19. At a selected time, switch Q2 is turned on by a selected signal applied to its gate through diode CR11 from a programmable unijunction transistor Q1 thereby allowing the charged stored on capacitors C16 and C17 to transfer to capacitor C19. The voltage on capacitor C19 accordingly is approximately 20 volts but the energy stored on this capacitor is increased substantially as a result of the charge transferred to this capacitor from capacitors C16 and C17 while switch Q2 is on. This output voltage on lead 102a is then transferred to a three-terminal integrated circuit voltage regulator of standard well-known design in the arts for use in producing a regulated 15 volt output signal for use in powering the internal integrated circuits in the switch mode power supply.

Diode CR10 provides a return current path when capacitor C19 is being charged. Resistor R9 and capacitor C18 serve as a timing circuit for controlling the unijunction transistor Q1 and resistors R10, R11 and R12 serve as part of this timing circuit. Resistor R12 lets the charge on the gate of transistor Q2 slowly leak off thereby stretching the pulse supplied to the gate through diode CR11. Diode CR8 is the return path for capacitor C16 during the transfer charge to capacitor C19.

Zener diode CR12 is connected with an emitter follower transistor Q23 and resistor R14 to provide a shunt regulator which is the equivalent of a large zener diode. This zener diode regulates the output voltage on lead 102a to approximately 20 volts.

Of interest, if capacitors C1 and C2 are made larger relative to capacitors C3 and C4, then capacitors C3 and C4 will charge more quickly. The correct ratio between the capacitances of capacitors C1 and C2 will avoid overcharging capacitors C3 and C4. This correct ratio is calculated from the circuit of FIG. 8 by choosing C1 and C2 such that, at the given line frequency f, the voltage across terminals 12a and 12b is $e_p$. The charge time constant of C3 and C4 is varied by varying the sizes of capacitors C1 and C2. The amount of overcharge of capacitors C3 and C4 can be varied by controlling the ratio of C1 to C2.

Other embodiments of this invention will be obvious to those skilled in the art in view of the above description.

What is claimed is:

1. A circuit for rectifying an AC input power waveform generated by an AC power supply to provide DC output voltage and current and for limiting inrush current into a storage capacitor means, said circuit comprising:

means for rectifying the AC input power waveform to provide a DC output voltage;

capacitive means for storing charge representing said DC output voltage and for providing said DC output voltage to a load; and means for precharging said capacitive means during initial start-up of said AC power supply, said precharging of said capacitive means acting to limit inrush current into said capacitive means when said AC input power waveform is applied to said means for rectifying to provide said DC output voltage to said load for normal operations.

2. Structure as in claim 1 wherein said AC power supply is provided with a first terminal and a second terminal, and said means for precharging said capacitive means for storing comprises a first capacitor connected relative to said capacitive means for storing such that said first capacitor is in series between said capacitive means for storing and said first terminal.

3. Structure as in claim 2 wherein said means for precharging comprises a second capacitor connected between said second terminal and said first capacitor and in parallel with said capacitive means for storing.

4. Structure as in claim 3 further including a first diode, having an anode and a cathode, connected in parallel with said second capacitor such that the anode of said first diode is connected to said first capacitor and the cathode of said first diode is connected to said second terminal.

5. Structure as in claim 4 wherein said capacitive means for storing includes at least one capacitor connected with a first lead and second lead, said at least one capacitor being in series with a second diode, the second diode having an anode connected to said second terminal and a cathode connected to said first lead of said at least one capacitor and the second lead of said at least one capacitor connected to said first capacitor.

6. Structure as in claim 5 further including means connected between said first capacitor and said second capacitor for providing a rectified output voltage and current for use as a source of internal power within a DC power supply.

7. Structure as in claim 5 wherein said capacitive means for storing has a positive plate and a negative plate and said first diode and said second diode are part of a full-wave rectifying bridge consisting of said first diode, said second diode, a third diode and a fourth diode, wherein said first diode is connected in said bridge such that the cathode of said first diode is connected to the anode of said second diode, wherein the cathode of said second diode is connected to the positive plate of said capacitive means for storing, wherein the anode of said first diode is connected to the negative plate of said capacitive means for storing, and wherein the second terminal of said AC input power supply is connected to the cathode of said first diode and the anode of said second diode.

8. Structure as in claim 7 further including a switch means having a first terminal and second terminal, wherein said third diode has a cathode and an anode, the anode of which is connected to the anode of said first diode, wherein said fourth diode has a cathode and an anode, the anode of which is connected to the cathode of said third diode and the cathode of which is connected to the cathode of said second diode, and wherein a lead connects the anode of said fourth diode and the cathode of said third diode to said first terminal of said switch means, said second terminal of said switch means being connected to said first terminal of said AC input power supply.

9. Structure as in claim 1 including resistive means connected in parallel with said capacitive means for storing, said resistive means having a first and second terminal, said first terminal of said resistive means comprising a positive output terminal of said circuit for rectifying and said second terminal comprising a reference terminal of said circuit for rectifying.

10. Structure as in claim 9 wherein said capacitive means for storing comprises a first capacitor connected in series with a second capacitor, said first capacitor having a terminal connected to the first terminal of said resistive means and said second capacitor having a terminal connected to the second terminal of said resistive means.

* * * * *